United States Patent
Werb et al.

(10) Patent No.: US 6,700,533 B1
(45) Date of Patent: Mar. 2, 2004

(54) ASSET AND PERSONNEL TAGGING SYSTEM UTILIZING GPS

(75) Inventors: Jay Werb, Newton, MA (US); Kevin Underriner, Exeter, NH (US); Martin Long, Lexington, MA (US)

(73) Assignee: RF Technologies, Inc., Brookfield, WI (US)

( * ) Notice: Subject to any disclaimer, the term of this patent is extended or adjusted under 35 U.S.C. 154(b) by 0 days.

(21) Appl. No.: 09/564,931

(22) Filed: May 4, 2000

Related U.S. Application Data

(60) Provisional application No. 60/132,772, filed on May 6, 1999.

(51) Int. Cl.[7] ............................. G01S 5/02; H04B 7/185
(52) U.S. Cl. ............................. 342/357.07; 342/357.09; 342/357.1; 342/357.03; 701/215; 701/220
(58) Field of Search ..................... 342/357.07, 357.09, 342/357.1, 357.03, 357.14; 701/215, 220

(56) References Cited

U.S. PATENT DOCUMENTS

| | | | |
|---|---|---|---|
| 4,658,357 A | 4/1987 | Carroll et al. ............... 364/406 |
| 4,703,327 A | 10/1987 | Rossetti et al. ............... 342/44 |
| 5,119,104 A | 6/1992 | Heller ......................... 342/450 |
| 5,223,844 A * | 6/1993 | Mansell ....................... 342/457 |
| 5,497,149 A * | 3/1996 | Fast ............................ 340/988 |
| 5,999,126 A * | 12/1999 | Ito ........................... 342/357.1 |
| 6,031,454 A * | 2/2000 | Lovejoy et al. .............. 340/539 |
| 6,188,353 B1 * | 2/2001 | Mitchell ...................... 342/386 |

FOREIGN PATENT DOCUMENTS

WO PCT/US97/19470 10/1997

* cited by examiner

Primary Examiner—Theodore M. Blum
(74) Attorney, Agent, or Firm—Wolf, Greenfield & Sacks, P.C.

(57) ABSTRACT

A system for tracking objects outdoors. Tags attached to objects such as trailers include GPS receivers. Tags transmit uncorrected position and satellite data to a base station, where differential corrections are applied, providing 2–5 meter accuracy of the position of the tag and object. Tags are on a low duty cycle. When a tag powers on, it receives accurate time and current satellite data from the base station, enabling the tags to acquire the satellite signal quickly and with minimum power consumption. When a tag is out of base station range, the tag periodically calculates and archives its position. The tag may also include Real Time Locating Systems technology, to enable tracking to continue when the tag moves indoors and becomes inaccessible to GPS satellite signals.

34 Claims, 6 Drawing Sheets

ASSET AND PERSONNEL TAGGING SYSTEM UTILIZING GPS

RELATED APPLICATION

This application claims the benefit, under 35 U.S.C. Section 119(e), of the filing date of prior provisional application Ser. No. 60/132,772, filed May 6, 1999 and titled Local Positioning System Designed for Outdoor Use.

BACKGROUND OF THE INVENTION

1. Field of the Invention

The present invention relates to locating objects.

2. Description of the Related Art

A new class of products is emerging in the marketplace. These systems are designed to track small, low-powered radio beacons that are attached to assets and personnel in a facility. The radio beacons are generally called "tags". The tags can be read at relatively long range, typically in excess of 50 meters. Antennas are installed indoors or outdoors in a grid-like fashion to cover a complete facility. The antennas remain in continuous contact with tags in range of the antennas.

Systems of this type are known as "Local Positioning Systems" (LPS), "Real Time Locating Systems" (RTLS), or "Local Locating Systems" (LLS). All of these names emphasize the ability of the systems to cover a complete indoor space (as distinct from covering gateways or portals), read tags from long distances, and determine tag locations. The term LPS indicates that techniques similar to Global Positioning System (GPS) techniques are used to determine tag location. Other RTLS technologies estimate location based on reader proximity and/or signal strength. RTLS systems as a group are distinguished from Radio Frequency Identification (RFID) in that RFID systems are designed to see tags at short range only, and catch them as they pass fixed points in a constrained process.

Referring to FIG. 1, Local Positioning Systems (LPS) are designed to track small, low-powered radio beacons that are attached to assets and personnel in a facility. One commercially available LPS is PinPoint's 3D-iD system, available from PinPoint Corporation, 1 Fortune Drive, Billerica, Mass. 01821. 3D-iD is comprised of two main components, shown in FIG. 1, a multi-antenna 102a–102d interrogator 101 that sends Direct Sequence Spread Spectrum interrogation signals 110 at 2.44 GHz to tags 103 (only one shown) that are in range. The tags transpond this interrogation signal, by receiving the signal at 2.44 GHz, mixing the carrier up to 5.80 GHz, filtering the result to comply with regulatory requirements, and transmitting a resulting FCC-compliant signal 112 at low power in the 5.80 GHz band. Interrogator 101 receives this resulting signal, extracts the tag's unique ID, and determines the tag's distance to each antenna by measuring the signal's time of arrival. By comparing the time of arrival with the time of transmission, round trip time of flight is estimated and the distance between the tag and the antenna accordingly is estimated. Information from the interrogator is sent to a host computer 105 (host) using a TCP/IP protocol, typically via an Ethernet connection 104. The host calculates the tag's location, and makes the information available to application programs. Other implementations of LPS have been designed; some of which are commercially available, such as, FireFly from it is to be understood that all such LPS systems share a requirement to install a matrix of interrogation points in order to read tags in range and determine their locations. However, there is a need for a system that can locate objects located outside of such area of coverage.

SUMMARY OF THE INVENTION

One embodiment of the invention is directed to an object locating system utilizing GPS including a tag, attached to the object, and a base station, having a host. The tag includes GPS circuitry, wireless LAN circuitry enabling communication between the host and the tag, and a power-saving feature. The power saving feature may take on numerous forms.

Another embodiment of the invention is directed to a locating system for use in an application including at least one mobile vehicle and at least one mobile object. The locating system comprises: a base station on the vehicle, the base station including a differential GPS receiver; and a tag attached to the object. The tag includes: GPS circuitry; and wireless LAN circuitry for communicating information between the tag and the base station. Inverted differential GPS corrections are performed at the base station on tag positional information. The object may be an individual (person).

An even further embodiment of the invention is directed to a location system for use in an application including at least one mobile object. The location system comprises: a host; and a tag placed on the object. The tag includes: GPS circuitry; inertial technology circuitry; and wireless LAN circuitry for communicating information between the tag and the host. When the tag loses communication with Navstar GPS satellites, the tag utilizes inertial technology to estimate its location as an offset to the last known GPS-based location. The object may be an individual.

DETAILED DESCRIPTION

Figure 1:
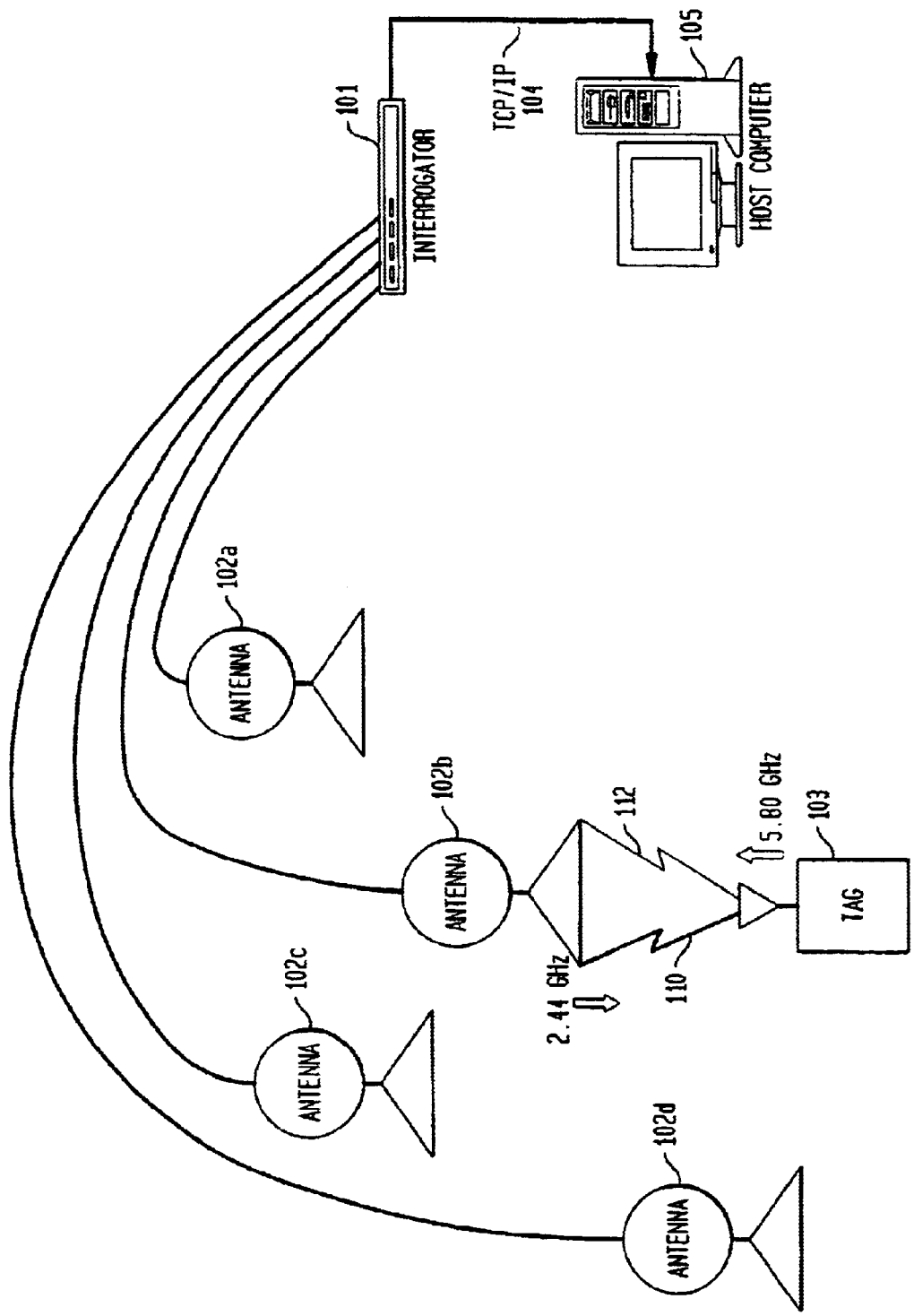
FIG. 1 shows an example LPS system.

"Local Positioning Systems" (LPS), "Real Time Locating Systems" (RTLS) and "Local Locating Systems" (LLS), as described in the background section of this specification, are designed to minimize tag cost. Tags do not "know" where they are. Instead, a network of interrogators work together to both provide coverage and determine tag location. This approach is effective when there are enough tags in an area to justify the infrastructure cost. When the density of tags is low, such as 25 or fewer tags per acre, it becomes plausible to consider schemes with higher tag cost, offset by a lower infrastructure cost.

There is a commercially available LPS known as PinPoint 3D-iD (3D-iD) available through PinPoint Corporation, Billerica, Mass. 3D-iD is representative of LPS systems in the sense that it is designed to support a high density of low-cost tags, with substantial cost per square foot being placed in the infrastructure used to read the tags. This is appropriate for indoor applications where many assets are tracked in the absence of a usable Global Positioning System (GPS) signal.

However, it is to be appreciated that part of the invention of this application is that it has been realized that there are numerous applications that are notable for three application characteristics:
1. Tags are placed on objects, such as trailers, that are not densely located within an area;
2. The applications span large areas and, thus, are impractical to cover with a network of LPS readers, given the relatively low density of tags; and
3. GPS satellite signals are available.

For example, some outdoor applications may have tag densities of fewer than 25 tags per acre. If interrogators are installed at a fully loaded cost of $0.10 per square foot, this results in a cost of about $4,000 per acre, plus the cost of the tags themselves. Such economics suggest that certain applications would benefit from a more expensive tag requiring minimal infrastructure. The above-defined three application characteristics point toward a design that incorporates a GPS receiver in a relatively sophisticated tag. The low density of tags justifies a more expensive tag in order to minimize the per-square-foot cost of yard coverage.

Such a tag can integrate two technologies. First, an inexpensive GPS receiver enables the tag to determine its own location. Second, a wireless radio technology provides a link to a host.

Low-cost GPS chip sets do not provide the 2–5 meter accuracy needed for many LPS applications. Therefore, a third technology is needed to improve accuracy through differential GPS. Differential GPS techniques, which give location accuracy in the range of 2–5 meters, can be implemented in a way that does not appreciably increase tag cost. Additionally, the tag can be designed in a way to minimize power consumption, thus extending battery life.

A GPS-enabled tag according to an embodiment of the invention, will not simply act as a beacon; instead, it will ascertain its own location and communicate that location to a host computer. For outdoor applications, GPS chipsets from vendors such as Trimble Navigation Limited (749 North Mary Avenue, Sunnyvale, Calif. 94086) and SiRF Technology (148 E. Brokaw Road, San Jose, Calif. 95112) are becoming inexpensive enough to embed in tags; cost is under $25 per tag in the Year 2000 and that is expected to decrease over time. Likewise, communication chip sets for industry standard protocols for wireless radio (Com Radio) such as 802.11 or DECT are currently available for under $50 and are expected to rapidly decrease in cost. With both of these technologies combined in a tag, costs in the range of $100–$200 are achievable today, with further cost reductions likely into the future.

Figure 2:
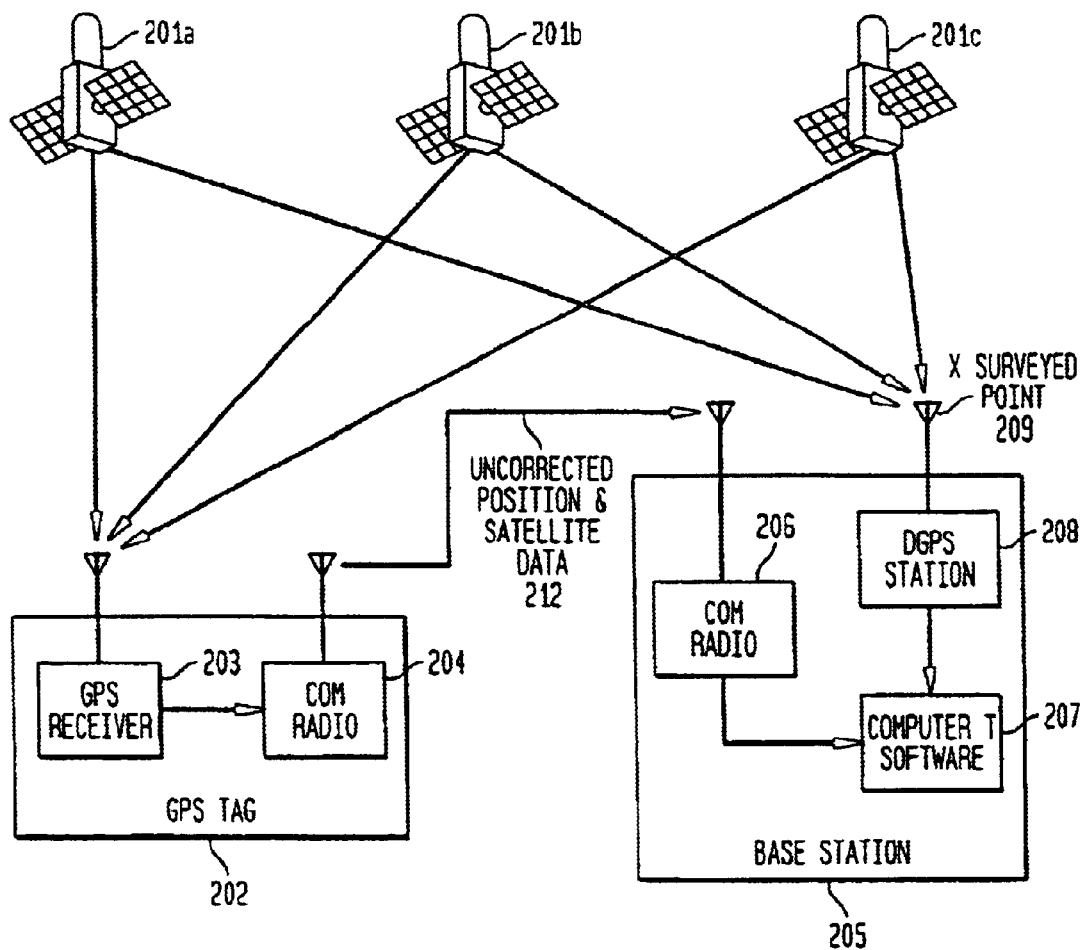
FIG. 2 shows the operation of a GPS tag.

FIG. 2 illustrates an embodiment of a system according to the invention, which includes a tag incorporating a GPS receiver, henceforth called a "GPS Tag". The GPS Tag 202 receives navigation signals from a constellation of Navstar satellites, represented by 201*a*, 201*b*, and 201*c*. A GPS Receiver 203 in the GPS tag decodes the navigation signals and estimates the tag's position. Several GPS Receivers are commercially available, for example one of Timble's Lassen GPS modules (such as the Lassen SK8). In one embodiment, a low-cost receiver is used, providing relatively inaccurate position estimates. These uncorrected position estimates are transmitted via signal 212 to the Base Station 205 using Com Radios 204 (GPS Tag transmit) and 206 (Base Station receive). Differential corrections are applied at the Base Station, using an off-the-shelf Differential GPS (DGPS) receiver technology 208. An example of an available DGPS is Trimble's Inverted Differential GPS Base Station. The Differential Receiver 208 can be placed at any convenient pre-surveyed location 209 on the site, such as on the roof of a warehouse. This receiver is used to calibrate the errors received from each satellite in view, which is applied to the data received from tag 202. The result is a reasonably accurate estimate of the tag's location, in the range of 2–5 meters, which is good enough to distinguish a location within one or two parking spaces.

It is also possible to enable each tag for differential GPS, but with today's technology this would unnecessarily increase the cost of the tag. It is to be appreciated, however, that for applications with relatively few tags, such an approach may nonetheless be preferable and is intended to be within the scope of this application.

The Com Radio Modules 204 & 206 can be provided using one of the mainstream Wireless Local Area Network (WLAN) standards, such as 802.11 or DECT/PCS. The choice is driven by other uses for the communication infrastructure. For example, if the yard already has 802.11 installed for support of mobile terminals, then 802.11 is a logical choice. DECT/PCS may be preferred where local voice applications predominate. The costs per tag are similar, with the communications circuitry costing less than $50 per tag, and with that cost rapidly decreasing. For a lower cost link, 900 MHz technology can also be utilized. It is to be appreciated that any wireless communication device can be used, that the tag may be broken up into its individual parts, and that these modifications are intended to be within the scope of the invention. For example, the tagged item may be a vehicle that already incorporates a cell phone that might be used for the wireless connection; with the caveat that a public cellular network may be an expensive, power-hungry, and time-consuming way to send position updates (of a few bytes each) to a location that is not very far away. In addition, the Base Station Com Radio 206 is not necessarily co-packaged as shown in FIG. 2. For example, 802.11 access points are usually directly connected to an Ethernet LAN. To provide 802.11 coverage of an entire yard, several 802.11 access points may be required. Thus, the Com Radio 206 may actually be implemented as several remote radio access points communicating with the Base Station 205 over a LAN.

For vehicle applications, power for the tag can be drawn from the batteries in the vehicles. Alternatively, the tag can include batteries that may be recharged by solar power. For low cost and ease of installation, it is possible to employ simple conventional batteries, such as lithium cells, and use power judiciously for long life. The architecture of a GPS Tagging System provides several opportunities for power management to extend the life of such batteries.

It is not necessary for the GPS receiver to be enabled until it is in range of a base station. Accordingly, in one embodiment of the tag and system of the invention, the tag is normally asleep, waking up periodically to check if it is in range of a base station. Most commercially available Com Radios 204 and 206 include a flexible means for a mobile radio to efficiently search for a nearby network access point.

Figure 3:
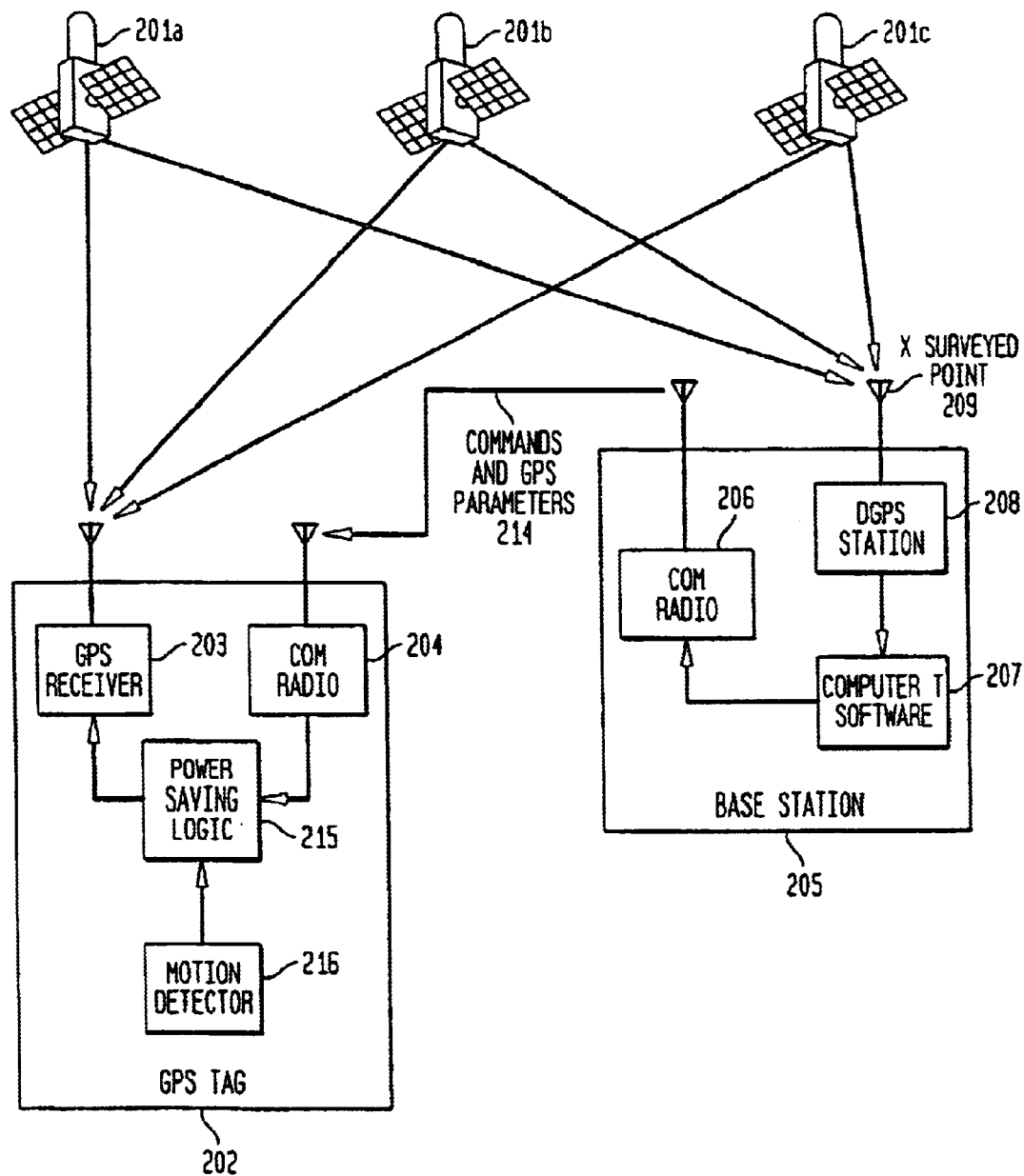
FIG. 3 shows the initialization of a GPS tag according to an embodiment of the invention.

Once it is determined that a GPS Tag 202 is in the range of a Base Station 205, the Base Station can transmit information that will help the GPS module decrease its acquisition time, as shown in FIG. 3. FIG. 3 is similar to FIG. 2, except that the reference/initialization data and commands are moving from the Base Station's DGPS Station 208 to the GPS Tag's Power Saving Logic 215. This Power Saving Logic dramatically reduces the time the GPS Receiver needs to operate to determine its location. GPS parameters are provided from the Base Station to allow the GPS Receiver to more quickly synchronize with Navstar satellites. Commands from the Base Station control the frequency of determining the locations. A Motion Detector 216 in the GPS Tag helps determine whether it is necessary to update the Tag location. The purpose is to enable the GPS Receiver to use no more power than is necessary.

Both to improve system response times and reduce power requirements of the tag, there are various ways that the tag and system of this embodiment of the invention can take advantage of the fact that the base station and the tag are in the same vicinity. Trimble's Lassen LP GPS module, which might be used in GPS Receiver 203, gives 4 specifications for acquisition time. A cold start is specified as no initialization, and takes 130 seconds. A warm start, specified at 45 seconds, takes advantage of "that last position, time, and almanac are saved in battery-backed memory"; this information can be provided from the Base Station 205 through the Coms Radios 206 and 204. A hot start, specified at 20 seconds, "implies ephemeris is also saved"; which the Base Station can also provide. Finally, reacquisition after signal loss is specified at 2 seconds. Since the Base Station is reading almost the same GPS signal as the tag, this information might also be downloaded by the Base Station and sent to the tag, with the main challenge being that the time base of the tag and the base station need to be synchronized. In the case of 802.11, the system is synchronous and time slotted, with a data transmission rate of about one bit every 1 microseconds (or less). Thus, a synchronous communications link can be used for time synchronization on the order of about 1 microseconds, corresponding to about a 1000-foot error (light travels about one foot per nanosecond). Since the Base Station can also transmit the location and altitude of the facility, the tag can thus greatly limit its search and lock onto the satellites very quickly.

For coarser-grained time synchronization, full packets can be used. Packet-level time synchronization yields accuracy on the order of the packet length, i.e., some fraction of a millisecond.

In another embodiment of a tag and system of the invention, a motion detector can be used to help conserve power consumption. For additional power management of tags attached to vehicles and trailers, there are relatively few times that the tag is both in motion and within range of the base station (since the vehicles are parked for most of their time in the yard). Likewise, most assets stored outdoors are moved infrequently. Thus, a motion detector in the tag, such as a mercury jitter switch, can greatly reduce the need to operate the tag's GPS Receiver 203. Base Station Software 207 can also instruct the tag when locations need to be calculated, either in response to a user request or on a repeated scheduled basis. For example, an asset management system may command a specific tag to recalculate its position more frequently when a move is scheduled. Alternatively, all tags may be commanded to recalculate their positions less frequently at night when a yard is not in operation.

In another embodiment of the tag and system of the invention, the communications capability of the tag can be leveraged for wireless monitoring of devices throughout the yard. For example, in trailers of refrigerated goods, the tag's communication module can be integrated with a temperature monitor to verify that the trailer's refrigeration unit is operating correctly. Similarly, vehicle parameters such as fuel levels, odometer readings, hours of operation, and so forth can be monitored by the tag and reported, which combined with vehicle location can be used for maintenance purposes.

In another embodiment of the tag and system of the invention, the tags can be used to archive vehicle activities when it is outside of the range of a base station. For example, after the truck leaves the yard its location is calculated periodically, stored in the tag's memory, and these time-stamped location readings can be downloaded to the Base Station when the truck returns. The inexpensive GPS Receiver 203 in the tag, which is likely not enabled for DGPS, will only calculate approximate location of the tag, which is adequate for collecting some productivity and other historical information. For applications where higher accuracy is required, the Base Station can archive time-stamped differential corrections and apply these to the time-stamped archives on the tag. If integrated with a cellular phone in the vehicle, location archives can be downloaded to a base station periodically through public phone networks. Eventually, the tag's clock, if uncorrected, will lose synchronization with the base; however, the tag's GPS receiver can be used to keep its clock accurate. When out of range of the base station, most of the power management techniques described above (which are base-station driven) are not available; thus, for this embodiment such a tag can be provided with, for example, an external and/or rechargeable power source for long life.

Figure 4:
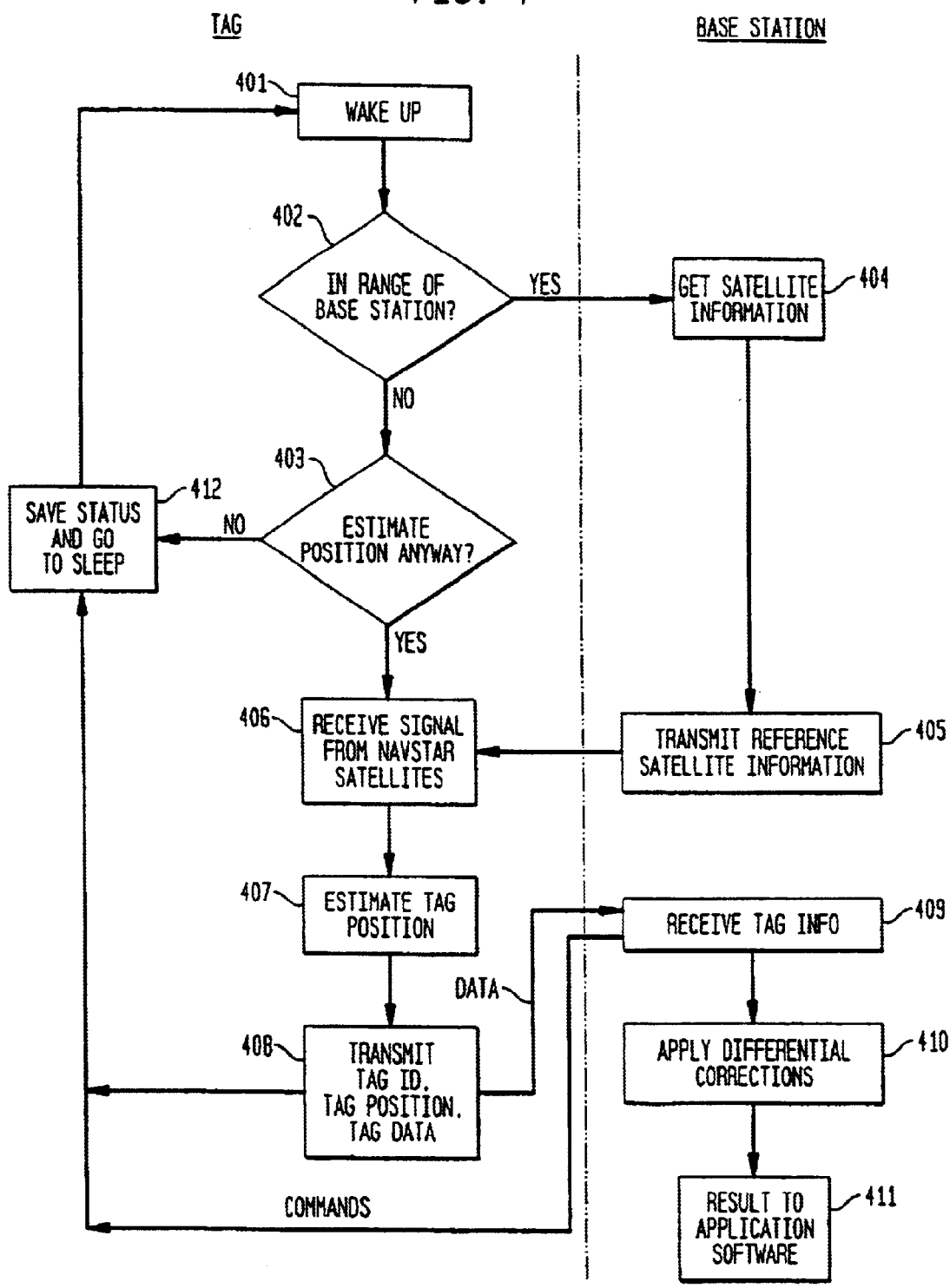
FIG. 4 is a flow diagram of GPS tag operation according to an embodiment of the invention.

FIG. 4 illustrates an embodiment of a method of the invention for the operation of a GPS Tag working in conjunction with a Base Station. The tag is usually in a sleep state to conserve power. Some microprocessors, such as the Microchip 16F84 (sold by Microchip Technology Inc., 2355 West Chandler Blvd., Chandler, Ariz., 85224-6199) include a watchdog timer for a very low-powered sleep state. The end of the sleep period might be triggered by a motion sensor in the tag and/or the passage of time. At the end of the sleep period, the tag wakes up 401 and checks if it is in range of a Base Station 402. If communication with a Base Station is established 402, the Base Station determines the instantaneous status of GPS satellites in view 404 and transfers this information to the GPS Tag as a reference 405. Data transmitted may include Base Station position, current time, almanac, and ephemeris.

If a Base Station is not in range 402 No, the GPS Tag may proceed with a position estimate anyway 403 Yes; such position estimate is logged for future transmission when a base station comes into range of the tag. Without data from the Base Station, it will take more time and power to lock onto available GPS satellites, so such estimates may not be done very frequently if there are power constraints. For example, if a Base Station is in range, the tag's position may be calculated once per minute when the tag's motion sensor indicates that the tag is in motion. When the tag is in motion and out of reach from the base station, or if the tag is not in motion, the position may be calculated and archived less frequently, such as every 2–6 hours.

If the tag is to determine its location, it locks onto the signals of several Navstar satellites 406 as supported by the GPS Receiver 203. The time and power typically used to acquire this data depends on the data provided by the Base Station. The tag's position is calculated 407, and reported to the Base Station 408, along with the tag's unique identification code and possibly data from devices such as temperature sensors integrated with the tag. The Base Station receives this data 409, and optionally sends commands 414 back to the tag to affect its next sleep cycle; for example, a tag that is planned to be moved soon may be commanded to wake up more frequently. The Base Station applies differential corrections 410, and posts the results 411 to application software through some combination of messages between computers and/or writing the data to a database.

At the end of the cycle, the tag determines the amount of time it should go to sleep, saves status information necessary to efficiently implement the next cycle (such as current tag position), and goes to sleep 412 for the prescribed period.

As an example application, consider catering trucks at an airport. There is a need to monitor truck locations within the airport, and also to report fuel and operational status to aid periodic maintenance. Additionally, it is of great interest to archive exactly when a truck arrives at an aircraft, to verify that the catering department (or subcontractor) is not at fault should a flight delay occur.

Figure 5:
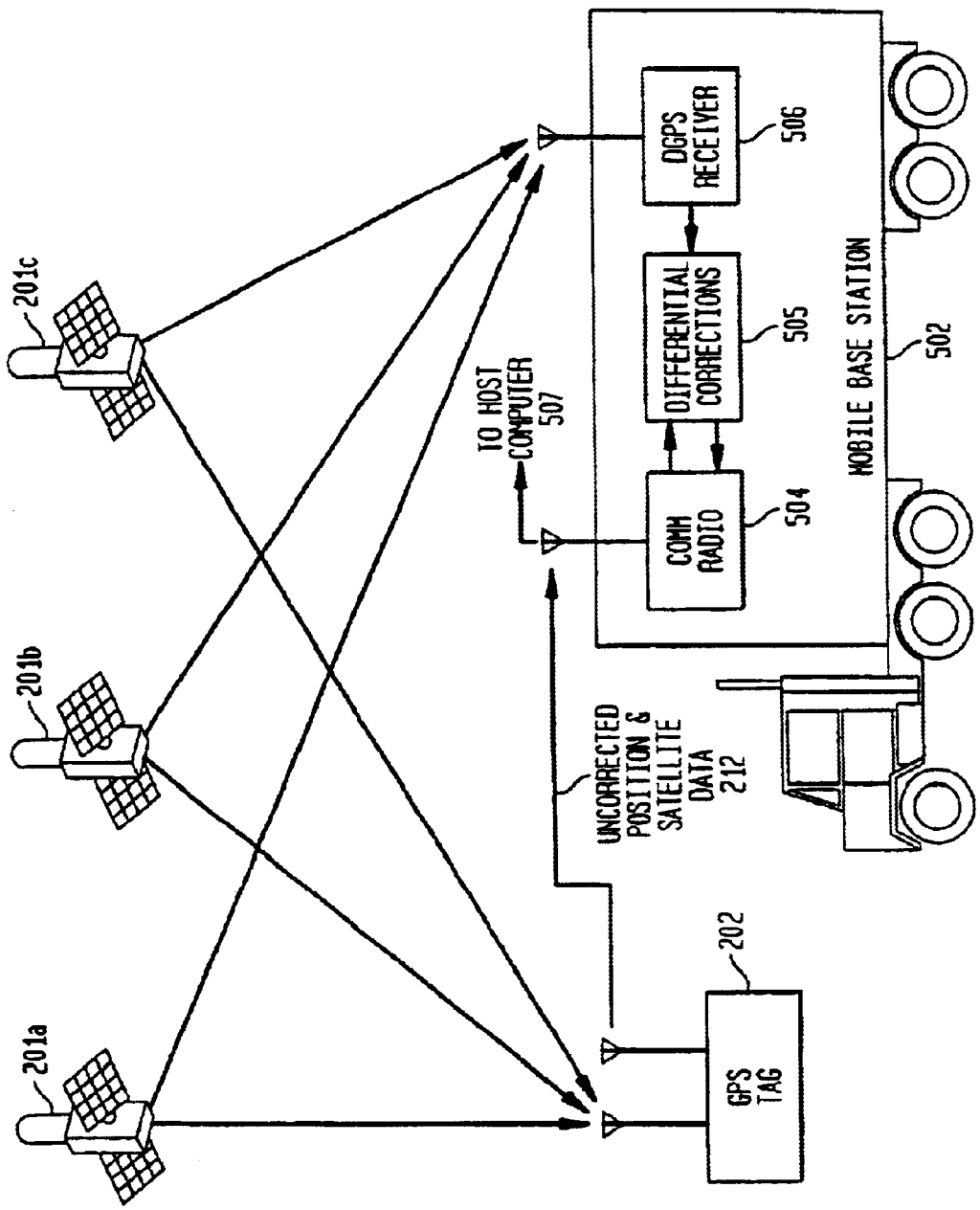
FIG. 5 is a diagram showing a system according to an embodiment of the invention.

In another embodiment of the tag and system of the invention, to be used for applications such as road construction or other mobile operations, the Base Station(s) can be mobile, installed in one or several of the vehicles that move with the tagged personnel and assets. Since the Base Station is mobile, it is not possible to use a fixed surveyed position as a basis for providing differential corrections as shown in FIG. 2. Instead, the Base Station's position is determined using a commercially available Differential GPS receiver. From this reference position, the relative positions of other individual tags in range (which do not include differential GPS hardware for cost and power reasons) can be accurately assessed and archived. FIG. 5 shows the operation of a Mobile Base Station 502. GPS tags 202 operate as in FIG. 2, sending data 212 to the Mobile Base Station for processing. The Mobile Base Station includes a Differential GPS Receiver 506. Various Differential GPS options are commercially available; with the choice driven by the local services available and the accuracy required. Data from the Differential GPS Receiver is used to apply Differential Corrections 505 to all data received by the Com Radio 504. The data may be processed locally, such as for display in the Mobile Base Station's vehicle. Alternatively, if the Mobile Base Station is part of a fleet of such vehicle-mounted devices, the data is transmitted 507 to a Host where all tag data is consolidated into a software application. Not shown in FIG. 5, but included within the scope of the invention, is a replica of the process described in FIG. 3 whereby initialization and command data is transmitted from the Mobile Base Station 502 to the GPS Tag 202.

Figure 6:
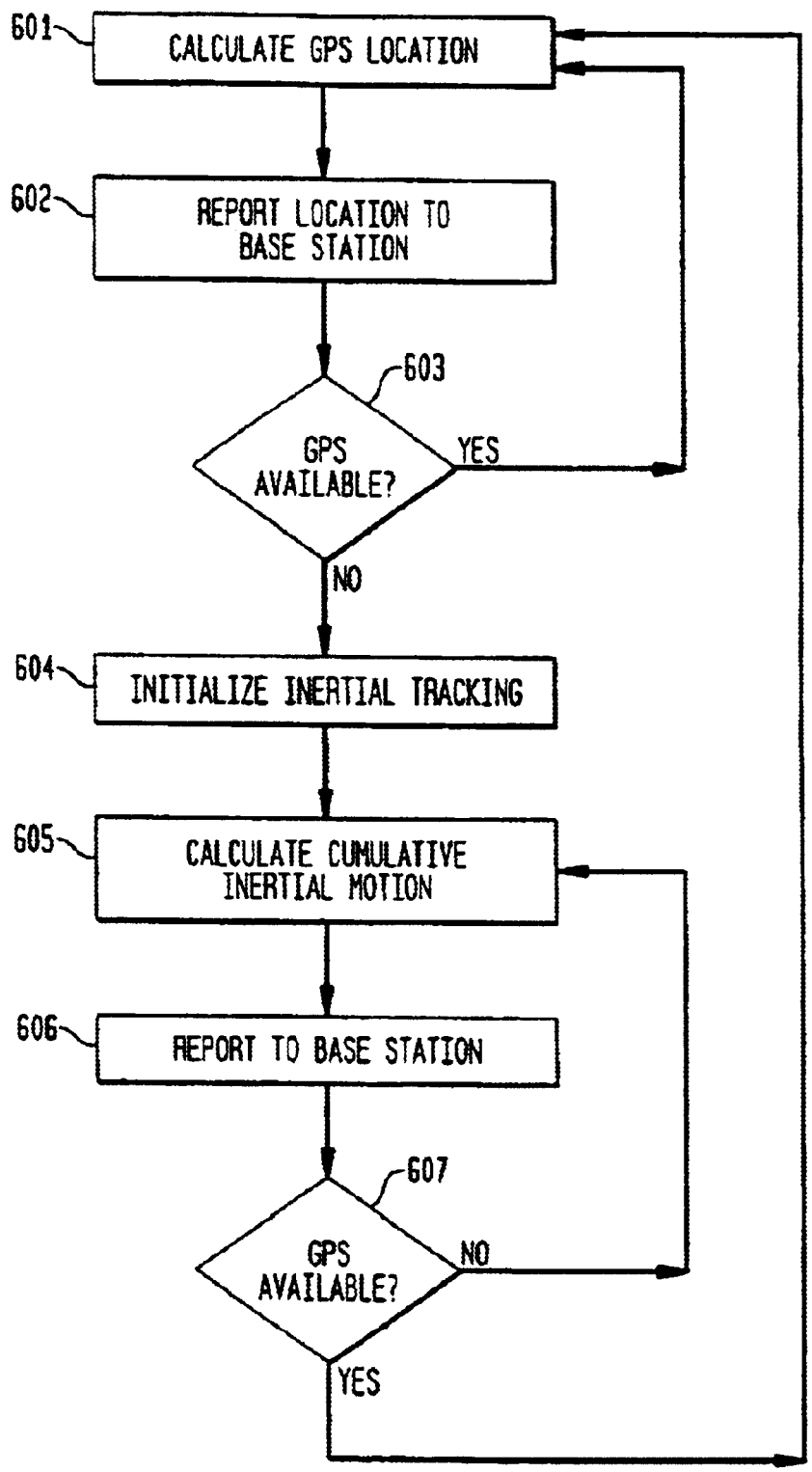
FIG. 6 is a flow diagram showing operation of a tag according to an embodiment of the invention.

An important application for a mobile Base Station is to track rescue workers, such as firefighters. A tag carried by rescue workers may operate in several modes. Outdoors, the tag operates like a GPS Tag 202, and its location is tracked in reference to base station(s) in surveyed locations and/or mobile base stations in range. Once the worker goes indoors and out of GPS range, the system may record the tag's last known location. An enhanced GPS Tag may also incorporate inertial technology and report cumulative changes in position since the GPS signal was lost. When the worker emerges outdoors, the tag's GPS-based location can again be fixed in reference to a base station. This is shown in FIG. 6. When operating outdoors, the tag continuously calculates its own location 601 using GPS, and reports this location to the Base Station 602. As described previously, differential corrections may be applied at the base station. If the tag loses contact with the GPS satellites 603, it switches to inertial tracking 604, continuously calculating cumulative inertial motion 605 and reporting this information to the Base Station 606. The Base Station combines the inertial information with the last known GPS-based location to estimate the worker's location within the building. When GPS signals again become available 607, the tag reports GPS information to the Base Station.

The Com Radio 204 and 206 for a tag designed for rescue workers should be selected for its ability to penetrate construction material. Since these tags can be recharged between uses, power management is not a major consideration. Therefore, a relatively high power and low frequency radio is preferred, such as found in communication devices commonly used by rescue workers.

An estimate of a rescue worker's location may not be perfectly accurate, particularly if inertial navigation errors have accumulated since the last time the worker was able to access the GPS satellites. If the worker needs to be found in a potentially smoke-filled or chaotic environment, a handheld device can be used to find the tag. The handheld device commands a particular tag to emit an encoded radio and/or an ultrasonic beacon signal, and then displays the signal strength of the radio and/or ultrasonic beacon. The operator of the handheld unit finds the tag by noticing an increased signal strength as he or she moves closer to the tag. When the handheld is relatively close to the beacon signal, as indicated by a high signal strength, the operator commands the tag to emit an audible signal.

For some applications, there is a strong incentive to combine a GPS Tag as described above with RTLS technology described above, in the same package, to support any of the following modes of operation:

1. When the tag is outdoors, within range of a base station, GPS can be used for location tracking.
2. When the tag is outdoors, but not within range of a base station, GPS can be used to archive the tag's location, which is downloaded periodically through a cell phone or in batch mode when the tag returns within the range of the base station.
3. When the tag is indoors, outside of the range of GPS, an RTLS infrastructure within the building determines the tag's location, using a low-cost transponder within the tag.
4. For indoor spaces that do not justify the cost of an RTLS infrastructure, an approximate location of the tag can be inferred by a tag's ability to connect with the base station. For example, if 802.11 is used as the communications stage, and the indoor space is covered by 802.11 in order to support voice communications and/or RTLS, the tag's approximate location can be ascertained by identifying the base station that is currently in communication with the tag. Accuracy in the range of 100–200 feet can be achieved, with improvements by using directional antennas and variations in signal strength.

It is to be appreciated that depending on the requirements for a particular tag, a combination of any of RTLS, WLAN, GPS, and/or RFID technologies can be combined in tags as appropriate and that such combination and/or modifications are intended to be within the scope of this application.

It is to be appreciated that all of the configurations described herein can feed location information into a software system, and data from these numerous sources can be processed, displayed, and archived similarly. One mode for distribution of such data is through the publish/subscribe ViewPoint software and API sold by PinPoint Corporation. However, it is to be appreciated that variations and modifications for handling the tag position data, apparent to one of skill in the art are also intended to be within the scope of this application.

Having thus described certain embodiments of the present invention, various alterations, modifications and improvements will be apparent to those of ordinary skill in the art. Such alterations, variations and improvements are intended to be within the spirit and scope of the present invention. Accordingly, the foregoing description is by way of example and is not intended to be limiting. The present invention is limited only as defined in the following claims and the equivalents thereto.

What is claimed is:

1. An object locating system utilizing GPS including a tag, attached to the object, comprising:
   a base station including a receiver for receiving a tag signal from the tag, and a processor; and
   the tag comprising:
      GPS circuitry including a GPS receiver for receiving a GPS signal; and
      communication circuitry enabling wireless communication between the base station and the tag, the communication circuitry including a transmitter for transmitting the tag signal to the base station;
      wherein the tag signal transmitted to the base station receiver includes GPS-based position information derived from the GPS signal and tag information; and
      wherein the processor at the base station is adapted to determine a position of the tag using any one of and both of the tag signal and the GPS-based position information received from the tag signal.

2. The system as claimed in claim 1, wherein the base station further comprises a transmitter for transmitting an information signal to the tag, wherein the tag includes a power-saving device by which the tag sleeps periodically, and wherein the communication circuitry further includes a receiver for receiving, when the tag awakes from sleeping, the information signal from the base station.

3. The system as claimed in claim 2, wherein the information signal includes at least one of a position of the base station, a time, altitude and GPS satellite information.

4. The system as claimed in claim 1, wherein the tag has a motion detector adapted to awaken the tag when the motion detector detects motion of the tag.

5. The system as claimed in claim 4, wherein the tag is configured such that a position of the tag is determined more frequently when the tag is in range of the base station and the motion detector determines that the tag is in motion, than when the motion detector determines that the tag is not in motion.

6. The system as claimed in claim 4, wherein the tag is configured to archive the position of the tag periodically when the tag is out of range of the base station and the motion detector determines that the tag is in motion.

7. The system as claimed in claim 6, wherein the base station is configured to, when the tag is back in range of the base station, download a time-stamped archive from the tag.

8. The system as claimed in claim 1, wherein one of the tag and base station are configured to apply differential corrections to a position of the tag based on the GPS-based position information.

9. The system as claimed in claim 1, wherein the base station further includes a transmitter for transmitting an information signal, including commands, to the tag, wherein the tag includes a receiver for receiving the information signal from the base station and a power savings device; and wherein the power savings device controls how frequently the tag determines its position based on the commands received from the base station.

10. The system as claimed in claim 1, wherein the base station includes a wireless LAN that is used for communication of the tag signal between the tag and the base station.

11. The system as claimed in claim 1, wherein the tag further comprises a receiver for receiving information from the object relating to operating characteristics of the object, and the transmitter is configured to also transmit the information to the base station.

12. The system as claimed in claim 10, wherein the base station is configured such that when the tag does not receive adequate GPS signals to determine the position of the tag, the wireless LAN is configured to estimate a position of the tag based on the tag's proximity to a wireless LAN access point coupled to the base station.

13. The system as claimed in claim 1, the tag further including RFID electronics.

14. The system as claimed in claim 1, the tag further including LPS electronics.

15. The system as claimed in claim 1, wherein the base station includes a GPS receiver that receives GPS position signals, wherein the tag further includes a receiver for receiving a signal from the base station, and wherein the base station is adapted to send satellite information to the tag to assist the GPS circuitry in the tag in receiving the GPS signal.

16. The object locating system as claimed in claim 1, wherein the processor at the base station is adapted to use the tag signal to determine that the tag is within range of the base station.

17. The object locating system as claimed in claim 1, wherein the base station comprises a plurality of antennas and a real-time location device, and wherein the base station is adapted to determine the non-GPS based position information of the tag based on the tag signal transmitted from the tag to at least some of the plurality of antennas with the real-time location device.

18. The object locating system as claimed in claim 1, wherein the tag further comprises inertial tracking circuitry including a motion detector that generates a motion signal in response to movement of the tag, and a processor that calculates cumulative inertial motion of the tag based on the motion signal received from the motion detector.

19. The object locating system as claimed in claim 18, wherein the tag is configured to transmit the tag signal including the cumulative inertial motion of the tag to the base station using the transmitter.

20. An object locating system utilizing GPS including a tag, attached to the object, comprising:
   a base station including a receiver for receiving a tag signal from the tag, and a processor; and
   the tag comprising:
      GPS circuitry including a GPS receiver for receiving a GPS signal; and
      wireless LAN circuitry enabling communication between the base station and the tag;
      wherein the tag is configured such that the GPS circuitry in the tag operates more frequently to receive the GPS signal and to determine a position of the tag when the tag is able to communicate by the wireless LAN circuitry with the base station than when the tag is unable to communicate by the wireless LAN circuitry with the base station.

21. The system of claim 20, wherein the GPS circuitry in the tag is configured to operate only when the tag is able to communicate by the wireless LAN circuitry with the base station.

22. The system as claimed in claim 20, wherein the tag has a power-saving device that includes a motion detector within the tag.

23. The system as claimed in claim 22, wherein the system is configured such that a position of the tag is determined more frequently when the tag is in range of the base station such that the tag can communicate by the wireless LAN circuitry with the base station, and the motion detector determines that the tag is in motion, than when the motion detector determines that the tag is not in motion.

24. The system as claimed in claim 23, wherein the tag is configured to time stamp and archive the position of the tag periodically when the tag is out of range of the base station such that the tag can not communicate by the wireless LAN circuitry with the base station, and the motion detector determines that the tag is in motion.

25. The system as claimed in claim 24, wherein the system is configured such that when the tag is in range of the base station, the time-stamped archive is downloaded from the tag by the base station.

26. The system as claimed in claim 20, wherein the system is configured such that differential corrections to a position of the tag based on the GPS signal are applied one of at the tag and at the base station.

27. The system as claimed in claim 20, wherein the base station further includes a transmitter for transmitting an information signal, including commands, to the tag, wherein the tag includes a receiver for receiving the information signal from the base station and a power savings device; and wherein the power savings device controls how frequently the tag determines its position based on the commands received from the base station.

28. The system as claimed in claim 20, wherein the base station further comprises wireless LAN circuitry and wherein the base station is configured such that when the tag does not receive adequate GPS signals to determine the position of the tag, the base station wireless LAN circuitry is used to estimate a position of the tag based on the tag's proximity to a wireless LAN access point coupled to the base station.

29. The system as claimed in claim 20, the tag further including one of RFID and LPS electronics.

30. An object locating system utilizing GPS including a tag, attached to the object, comprising:
   a base station comprising a processor and a receiver, coupled to the processor, for receiving a tag signal from the tag; and the tag comprising:
   GPS circuitry including a GPS receiver for receiving GPS signals and
   communication circuitry enabling wireless communication between the base station and the tag;
wherein the processor at the base station is adapted to determine a position of the tag based on GPS-based position information received from the tag in the tag signal; and
wherein the communication circuitry comprises a transmitter that transmits the tag signal to the base station, and wherein the processor at the base station is further adapted to determine the position of the tag based on reception of the tag signal.

31. The system of claim 30, the tag further comprising:
a processor for determining GPS-based position information based on the GPS signals; and
a power-saving device that enables the tag to switch between a sleeping state and an awake state.

32. The system as claimed in claim 31, wherein the power saving device further comprises a motion detector, coupled to the processor, and wherein the processor in the tag is adapted to calculate cumulative inertial motion of the tag based on a motion signal received from the motion detector.

33. The system as claimed in claim 31, wherein a control signal transmitted from the base station includes instructions that control a frequency at which the power-saving device switches the tag between the sleeping state and the awake state.

34. The system as claimed in claim 33, wherein the control signal further includes information about a location of a GPS satellite.

* * * * *